Dec. 16, 1958    F. A. McDONALD ET AL    2,864,254
SAMPLE-TAKING VALVE
Filed April 23, 1956
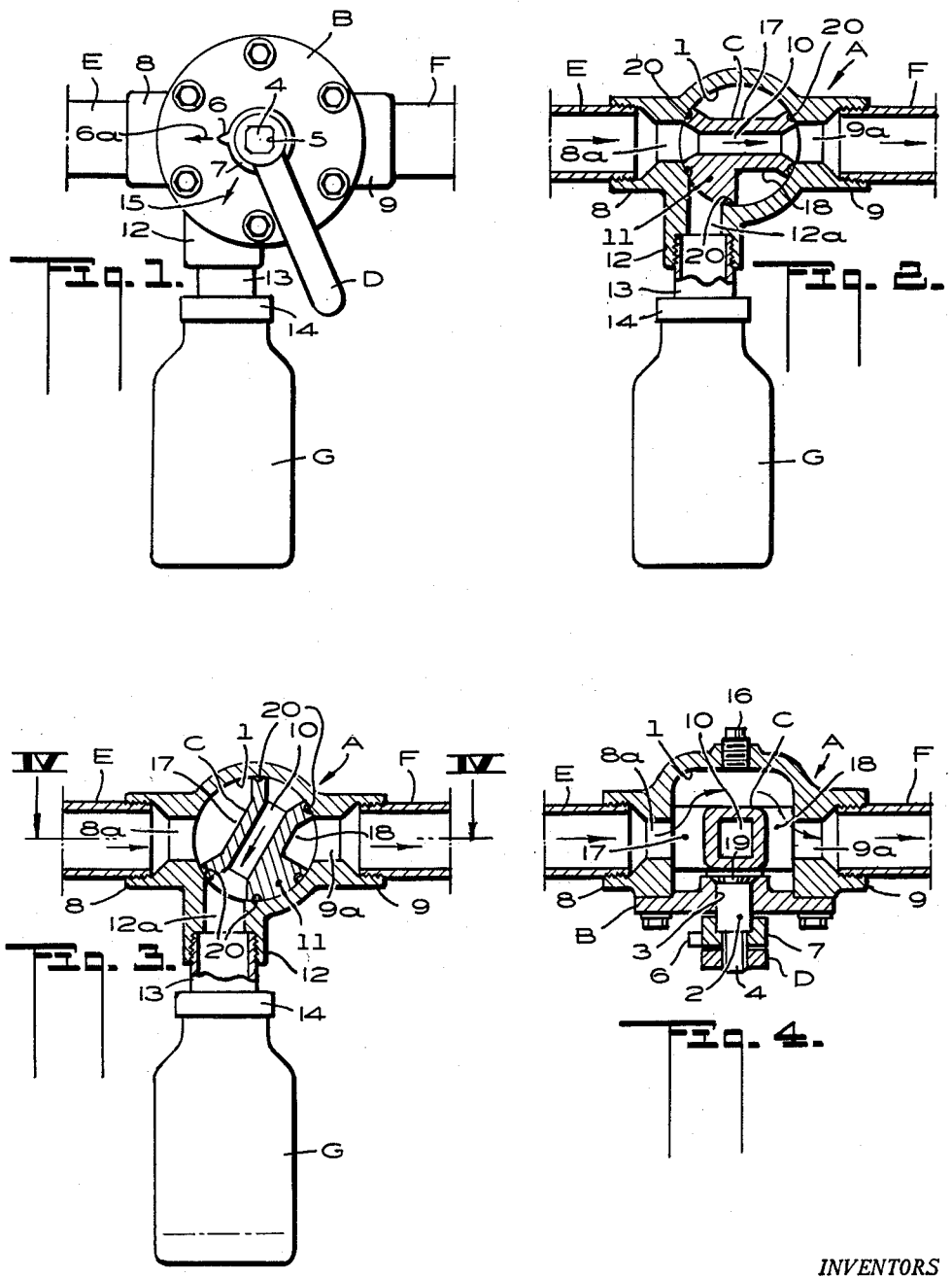
INVENTORS
FRANK A. McDONALD
WILLIS T. HOLMES
BY
Munn & Liddy
ATTORNEYS

United States Patent Office 2,864,254
Patented Dec. 16, 1958

2,864,254

SAMPLE-TAKING VALVE

Frank A. McDonald, Los Angeles, and Willis T. Holmes, Arcadia, Calif., assignors to U. S. Flexible Metallic Tubing Co., Los Angeles, Calif., a corporation of California Application April 23, 1956, Serial No. 580,077

3 Claims. (Cl. 73—424)

An object of our invention is to provide a sample-taking valve which will normally permit a flow of fluid or the like to pass through the passageway in the valve body without undue restriction. When the valve body is rocked for shutting off the normal passage through the valve, an auxiliary or secondary passage will be made available to permit the unhindered flow of material to continue passing through the valve.

A further novel point in the valve is that the primary passage in the valve body through which the fluid normally flows, has both ends of its passage immediately closed to the flow of fluid through the valve so that a full sample of a complete cross-sectional area of the fluid will be trapped instantly and it is this full sample of trapped fluid which is delivered to the sample-receiving container.

This is an important feature because in certain instances where oil is flowing from an oil well and is passing through a horizontal portion of the pipe in which the sample-taking valve is placed, the flow may be so slow as to permit the heavier oil particles to travel along the lower portion of the pipe and the lighter oil particles and any water contained in the oil, to travel along the upper portion of the pipe. Both the water and oil will form a stratification and will maintain their same relative positions as they pass through the valve body passage. Therefore when the valve body is turned to trap a portion of the fluid, a true sample of the water-oil ratio will be delivered to the sample-receiving container because an entire cross-sectional area of the fluid is trapped when the valve body is rocked and the entire sample is delivered to the sample-receiving container.

The valve may be manually operated. It is possible to have it operated by an automatic mechanism which will actuate the valve at predetermined time intervals.

Other objects and advantages will appear as the specification proceeds. The novel features will be set forth in the claims hereunto appended.

Drawing

Our invention is illustrated in the accompanying drawing in which

Figure 1 is a front elevation of the device;

Figure 2 is a view similar to Figure 1, but shows the valve in section and the valve body passage communicating with a pipe inlet and a pipe outlet;

Figure 3 is a view similar to Figure 2, but shows the valve body rocked for delivering a trapped fluid sample to the sample-receiving container; and Figure 4 is a horizontal section taken along the line IV—IV of Figure 3, and shows how the flow of fluid through the valve can continue unhindered, when the valve body is in the position shown in Figure 3.

While we have shown only the preferred form of our invention, it should be understood that various changes, or modifications, may be made within the scope of the annexed claims without departing from the spirit thereof.

Description

In carrying out our invention, we provide a valve casing indicated generally at A in Figures 2, 3 and 4. The casing has a hollow interior 1 and the front of the casing is closed by a cover plate or bonnet B (see Figure 4). A valve body or rotor C is rotatably mounted in the hollow interior 1, and the valve body has a shank 2 that is rotatably mounted in a bore 3 provided in the cover plate or bonnet B. Still referring to Figure 4, it will be seen that the outer end of the valve shank 2 is formed into a non-circular portion 4.

A stop collar 7 of the cross-sectional shape shown in Figure 4, is mounted on the shank 2. In fact the collar has a circular recess for receiving the cylindrical portion of the shank 2, and the recess communicates with a non-circular portion 4 of the shank. The stop collar's non-circular bore will receive the non-circular portion 4 of the shank 2. In this way the stop collar is "keyed" to the shank 2 so as to rotate therewith. The stop collar 7 has a pointer 6 formed thereon. A lever D (see Figure 1) has a non-circular bore 5 for receiving the outer end of the non-circular portion 4. A swinging of the lever will therefore swing the valve body or rotor C. Any means (none being shown) may be used for securing the lever D to the non-circular portion 4 of the valve rotor shank 2.

In Figures 2 and 3 we show the valve casing A as having an inlet 8 and an outlet 9. The valve rotor C has a passage 10 therein of the same cross-sectional area as the reduced portion 8a of the inlet 8, and the reduced portion 9a of the outlet 9. When the handle D is in a position where the pointer 6 will point toward the inlet 8, the rotor passage 10 will align with the inlet port 8a and the outlet port 9a. The bonnet B has an arrow 6a on its face pointing in the direction of the inlet port 8a. When the pointer 6 registers with the arrow 6a, the rotor passage 10 will be aligned with the inlet port 8a. A pipe E is connected to the inlet 8, and the fluid flows from the pipe E to the rotor passage 10, and then out through an outlet pipe F.

It will be noted that the valve body has a projection 11 that acts as a closure or a blank port for a sample-taking outlet 12 that otherwise communicates with the interior 1 of the valve casing. A pipe 13 communicates with the sample-taking outlet 12 and this pipe is provided with a cover 14 that receives a sample-taking container G. The outlet 12 has a port 12a which is normally closed by the blank port 11 of the rotor C.

When the lever D is swung so that its pointer 6 will register with an arrow 15 on the face of the bonnet B (see Figure 1), then the valve rotor will have been swung from the position shown in Figure 2 into that shown in Figure 3. The swinging of the valve rotor will trap the fluid, such as crude oil, that is flowing through the passage 10 and both ends of the passage will be moved out of registration with the ports 8a and 9a, and will therefore be closed to the inlet port 8a and the outlet port 9a. Figure 3 illustrates how the rotor passage 10 will be inclined and will register with the sample-taking port 12a so that the entire contents of the passage will flow through the port 12a, pipe 13, and will be delivered to the sample-taking bottle G. When the valve rotor C is in the position shown in Figure 3, the blank port 11 will uncover the sample-receiving port 12a that in turn communicates with the sample-taking outlet 12.

Figure 4 shows the hollow interior 1 of the valve casing as being large enough to permit the continuous flow of the fluid from the inlet pipe E to the outlet pipe F, even when the valve rotor has been swung into the sample-taking position shown in Figure 3. The valve casing interior 1 constitutes an auxiliary or secondary passage for the fluid when the valve rotor C is in sample-taking position. Therefore, the flow of fluid will be unobstructed when the valve rotor C is in the position shown in Figure 3. This is an important feature of the invention. It should be kept in mind that when a sample of the fluid is taken, then all of the fluid that is in the rotor passage 10 will be trapped when the lever D is swung, and therefore a complete cross-section of the fluid will be delivered to the sample-receiving container G.

*Operation*

From the foregoing description of the various parts of the device, the operation thereof may be readily understood. The sample-taking valve is connected to the inlet pipe E and the outlet pipe F as shown in Figure 3. Normally the valve rotor C is in a position where its passage 10 permits the flow of fluid from the pipe E to the pipe F.

When it is desired to take a sample of the fluid flowing through the pipes E and F, the handle D is swung for rocking the rotor C so that its passage 10 will be cut off from the pipes and will be placed in communication with the sample-taking outlet 12a. An entire cross-sectional volume of liquid in the passage 10 will be delivered to the container G. A true sample of the fluid is thus obtained.

The swinging of the rotor C into sample-taking position, does not interfere with the continued flow of fluid from the pipe E to the pipe F, because the interior 1 of the valve casing A, now constitutes an auxiliary or secondary passage between the two pipes. The container G may be removed from the cap 14 when desired and another container substituted.

The valve casing A is shown in Figure 4 as being provided with a plug 16 which may be removed when it is desired to clean out the interior of the valve casing.

The valve rotor C is entirely supported in the casing A by its peripheral contact with the interior cylindrical surface of the casing. The shank 2 gives additional support to the rotor as it is rotatably received in the bore 3 of the bonnet B. The length of the cylindrical portion of the valve rotor that contacts the inner cylindrical surface of the valve casing interior, is slightly greater than the diameters of the ports 8a and 9a. The valve rotor has cut-away portions or recesses 17 and 18 in its periphery that communicate with the ports 8a and 9a and with the interior 1 of the valve casing A to provide the auxiliary or secondary passage for the unrestricted flow of fluid through the valve when the rotor C is swung about a horizontal axis into an inclined position where the fluid will flow by gravity out through the port 12a. Figure 4 shows the entire interior of the valve casing from the rear wall of the rotor C to the rear inner wall of the valve casing interior as offering an unobstructed passage for the flow of fluid when the rotor is swung into sample-taking position, note the flow arrows in Figure 4. The rotor C is held against moving in the direction of its longitudinal axis by a conical portion 19 bearing against a conical seat on the inner face of the bonnet B, and by the stop collar 7 bearing against the outer surface of the bonnet. O rings 20 are provided around the ends of the rotor passage 10 to act as liquid seals. The blank port 11 also has an O sealing ring that seals the port 12a when the rotor is in the position shown in Figure 2.

We claim:
1. A sample-taking valve comprising a casing having a hollow interior with a rear wall and a cylindrical surface that has inlet and outlet ports therein; a bonnet for covering the casing interior and having a bore therein; a valve rotor having a shank rotatably received in the bore and a body with a periphery that rotatably contacts with the cylindrical inner surface of the casing interior; said rotor body having a passage therein that constitutes the only means of communication between the inlet and outlet ports when the rotor is in a predetermined position; said cylindrical surface also having a sample-taking port; said rotor body periphery having a portion closing the sample-taking port when the rotor passage is in communication with the inlet and outlet ports; said rotor being rotatable about a horizontal axis for moving the passage from communicating with the inlet and outlet ports, into an inclined position where the lower passage end will communicate with the sample-taking port; whereby the contents of the rotor passage will flow through the sample-taking port; the axial length of the valve body being less than the axial depth of the valve casing interior and said body having recesses in its periphery that register with the inlet and outlet ports when the rotor is in sample-taking position and communicate with the casing interior in back of the rotor body; whereby a secondary passageway for the unimpeded fluid flow is provided between the inlet and outlet ports when the rotor is in sample-taking position.

2. The combination as set forth in claim 1; and in which means is provided for preventing longitudinal movement of the rotor shank in the bonnet bore; whereby the valve rotor body will be held against axial movement within the valve casing interior.

3. A sample-taking valve comprising a casing having a hollow interior with a rear wall and a cylindrical surface that has inlet and outlet ports therein; a bonnet for covering the casing interior and having a bore therein; a valve rotor having a shank rotatably received in the bore and a body with a periphery that rotatably contacts with the cylindrical inner surface of the casing interior; said rotor body having a passage therein that constitutes the only means of communication between the inlet and outlet ports when the rotor is in a predetermined position; said cylindrical surface also having a sample-taking port; said rotor body periphery having a portion closing the sample-taking port when the rotor passage is in communication with the inlet and outlet ports; said rotor being rotatable for moving the passage from communicating with the inlet and outlet ports into a position where one end of the passage will communicate with the sample-taking port, whereby the contents of the rotor passage will flow through the sample-taking port; the valve body having cut-away portions which coact with said rear wall of the casing to define a secondary passageway of sufficient size for the unimpeded fluid flow between the inlet and outlet ports when the rotor is in sample-taking position.

References Cited in the file of this patent
UNITED STATES PATENTS

| | | |
|---|---|---|
| 1,219,442 | Dalton | Mar. 20, 1917 |
| 1,562,121 | Newton | Nov. 17, 1925 |
| 2,450,715 | Campbell | Oct. 5, 1948 |